(12) United States Patent  
Lindheimer et al.

(10) Patent No.: US 11,457,398 B2  
(45) Date of Patent: Sep. 27, 2022

(54) ACCESS CATEGORY AND ESTABLISHMENT CAUSE

(71) Applicant: Telefonaktiebolaget LM Ericsson (publ), Stockholm (SE)

(72) Inventors: Christofer Lindheimer, Vadstena (SE); Pontus Wallentin, Linköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 22 days.

(21) Appl. No.: 16/608,946

(22) PCT Filed: May 2, 2018

(86) PCT No.: PCT/IB2018/053062  
§ 371 (c)(1),  
(2) Date: Oct. 28, 2019

(87) PCT Pub. No.: WO2018/203263  
PCT Pub. Date: Nov. 8, 2018

(65) Prior Publication Data  
US 2020/0187092 A1    Jun. 11, 2020

Related U.S. Application Data

(60) Provisional application No. 62/502,136, filed on May 5, 2017.

(51) Int. Cl.  
*H04W 48/10* (2009.01)  
*H04W 76/27* (2018.01)  
*H04W 48/06* (2009.01)

(52) U.S. Cl.  
CPC ........... *H04W 48/10* (2013.01); *H04W 48/06* (2013.01); *H04W 76/27* (2018.02)

(58) Field of Classification Search  
CPC ...... H04W 48/10; H04W 76/27; H04W 48/06  
See application file for complete search history.

(56) References Cited

U.S. PATENT DOCUMENTS 10,111,165 B2 * 10/2018 Jang ............... H04W 48/18  
2010/0267391 A1 * 10/2010 Schmitt ........... H04W 76/50  
455/445

(Continued)

FOREIGN PATENT DOCUMENTS

CN    102118828 A    7/2011  
CN    102761933 A    10/2012

(Continued)

OTHER PUBLICATIONS

3GPP TS 24.105 v14.0.0; Technical Specification; 3rd Generation Partnership Project; Technical Specification Group Core Network and Terminals; Application specific Congestion control for Data Communication (ACDC) Management Object (MO) (Release 14)—Mar. 2017.

(Continued)

*Primary Examiner* — Muthuswamy G Manoharan  
(74) *Attorney, Agent, or Firm* — Sage Patent Group

(57) ABSTRACT

A method performed by a user equipment, UE, is disclosed. The method comprises determining (402) in response to an event (401) that triggers the UE to perform an access request to a radio access network, RAN, an access category to apply. The UE performs a barring check (403), applying the access category. Upon determining that access is not barred based on the access category, the UE sends (405) the access request to a network node in the RAN, the access request including (Continued)

the access category. The network node decides whether to accept or reject the access request based on the access category.

25 Claims, 14 Drawing Sheets

(56) References Cited

U.S. PATENT DOCUMENTS

| | | | | |
|---|---|---|---|---|
| 2014/0307550 | A1* | 10/2014 | Forssell | H04W 28/08 |
| | | | | 370/235 |
| 2015/0126147 | A1* | 5/2015 | Koskela | H04W 48/04 |
| | | | | 455/404.1 |
| 2018/0124679 | A1* | 5/2018 | Lee | H04W 48/06 |
| 2019/0268827 | A1* | 8/2019 | Kim | H04W 48/02 |
| 2019/0327663 | A1* | 10/2019 | Wirth | H04W 88/10 |

FOREIGN PATENT DOCUMENTS

| | | |
|---|---|---|
| CN | 103748811 A | 4/2014 |
| CN | 106471848 A | 3/2017 |
| JP | 2014 522199 A | 8/2014 |
| WO | 2013 022474 A1 | 2/2013 |
| WO | 2015 085430 A1 | 6/2015 |
| WO | 2016 006948 A1 | 1/2016 |

OTHER PUBLICATIONS

Korean Notice of Opinion Submission Patent customer No. 519987015051—dated Jan. 13, 2021.
Japanese Notice of Reasons for Rejection issued for Patent Application No. 2019-560180—dated Feb. 22, 2021.
3GPP TS 24.501 v1.0.0; Technical Specification; 3rd Generation Partnership Project; Technical Specification Group Core Network and Terminals; Non-Access-Stratum (NAS) protocol for 5G System (5GS); Stage 3 (Release 15)—Mar. 2018.
Office Action Issued By ROC (Taiwan) for Application No. 10920244680—dated Mar. 17, 2020.
Chinese Office Action issued for Application No. 201880029947.1—dated May 20, 2021.
Access Class Control Technology in LTE/LTE-Advanced Systems, Further Development of LTE-Advanced—Release 12 Standardization Trends—; Technology Reports by Kenichiro Aoyagi et al. (2015 NTT DOCOMO, Inc.)—2015.
PCT Notification of Transmittal of the International Search Report and the Written Opinion of the International Searching Authority, or the Declaration for International application No. PCT/IB2018/053062—dated Jul. 4, 2018.
3GPP TSG-RAN WG2 NR Ad Hoc; Spokane, USA; Source: Ericsson; Title: Access control for NR (Tdoc R2-1700397)—Jan. 17-19, 2017.
3GPP TSG-RAN WG2 NR Ad Hoc; Spokane, USA; Source: LG Electronics Inc.; Title: Unified access control mechanism for New RAT (R2-1700453)—Jan. 17-19, 2017.
3GPP TSG-RAN WG2 #99bis; Prague, Czech Republic; Source: Huawei, HiSilicon; Title: Slice-based Unified Access Control (R2-1710220)—Oct. 9-13, 2017.
3GPP TSG-RAN WG2 #97bis; Spokane, USA; Source: Ericsson; Title: Access Control for NR (Tdoc R2-1702865)—Apr. 3-7, 2017.
3GPP TSG-RAN WG2 NR#2; Qingdao, P.R. of China; Source: Ericsson; Title: Default access control categories (Tdoc R2-1706510)—Jun. 27-29, 2017.

* cited by examiner

ACCESS CATEGORY AND ESTABLISHMENT CAUSE

PRIORITY

This nonprovisional application is a U.S. National Stage Filing under 35 U.S.C. § 371 of International Patent Application Serial No. PCT/IB2018/053062 filed May 2, 2018 and entitled "ACCESS CATEGORY AND ESTABLISHMENT CAUSE" which claims priority to U.S. Provisional Patent Application No. 62/502,136 filed May 5, 2017 both of which are hereby incorporated by reference in their entirety.

TECHNICAL AREA

The present disclosure relates, in general, to wireless communication systems such as cellular networks, and more particularly, to methods, user equipments, and network nodes for transmitting and receiving messages related to wireless access.

BACKGROUND

When performing access to a wireless communication system, a user equipment (UE) must signal to the network that it wants to acquire communication opportunities. There are many schemes for how this can be done. For example, a UE can utilize air-interface resources (e.g., times, frequencies, etc.) to send a short message that would indicate to the network that a UE wants to communicate. Further details about a certain communication need can then occur in subsequent communication(s).

For wireless communication systems pursuant to 3GPP EUTRAN/LTE standard specifications, an example of this process can be seen in the flow diagram of FIG. 1, which shows random access and Radio Resource Control (RRC) connection establishment. A request for communication can start with a transmission of a random access preamble (111), also known as "msg1", on specifically allocated channels or resources. This random access preamble (111) is, when received by a base station or eNB, followed by a random access response (112), also known as "msg2", that includes an allocation of resources for continued signaling, such as RRC Connection Request (113), also known as "msg3". For the sake of brevity, this continued signaling (113-115) are not explained in detail here.

As can be realized, an access attempt will cost air interface resources. Both the initial message (111, Preamble) as well as resources for further signaling (112-115) will add to the wireless network load, simply to configure and setup communication resources for subsequent data transfer. It should be noted that even further communication is needed with network entities before any communication can take place. For the sake of brevity, these additional details are omitted from FIG. 1.

Under certain circumstances, it is desirable to prevent UEs from making these access attempts. For example, in case of an overload situation like radio resource congestion or shortage of processing capabilities, a network may wish to reduce overload by denying access to a cell or a portion thereof. The network may also need to prioritize between specific users and/or services during overload situations. For example, the network may give priority to emergency calls compared to ordinary calls.

To this end, the network may employ what is in 3GPP referred to as access control. Access Class Barring (ACB) is an example of one such control. In short, access barring is about preventing or making it less likely that a UE will attempt to send an access request (e.g., to initiate the sequence above by sending a preamble, 111). In this way, the total load in the system can be controlled. The network may, for example, divide UEs or different reasons for why a UE wants access into different classes, or categories and dependent on this, the network can differentiate and make it less likely that, e.g., certain UEs and/or certain events trigger access requests. For example, a given UE may belong to a certain access class and the network may communicate, via broadcasted system information, that certain classes at certain instances are barred, (e.g., not allowed to make access, or allowed to make access with a lower probability if not barred altogether). When a UE receives this broadcasted system information, if it belongs to a barred access class, it may result in that a UE will not send an access request. There are multiple variants of access barring mechanisms specified for LTE, including, some of which are listed and described at a high level of detail below:

1. Access Class Barring as per 3GPP Rel-8: In this mechanism, it is possible to bar all access requests from a UE. Normal UEs in Access Class (AC) range 0-9 are barred with a probability factor, also referred to as barring factor and a timer, also referred to as barring duration, whereas specific classes can be controlled separately. Besides the normal classes 0-9, additional classes have been specified to control the access to other type of users, e.g. emergency services, public utilities, security services, etc.
2. Service Specific Access Control (SSAC): The SSAC mechanism allows a network to prohibit Multi-Media Telephony (MMTel)—voice and MMTel-video accesses from a UE. The network broadcasts barring parameters (parameters similar to ACB) and a barring algorithm that is similar to ACB (barring factor and random timer). An actual decision if access is allowed is done in the IP Multi-Media Subsystem (IMS) layer of a UE.
3. Access control for Circuit-Switched FallBack (CSFB): The CSFB mechanism allows a network to prohibit CSFB users. A barring algorithm used in this case is similar to ACB.
4. Extended Access Barring (EAB): The EAV mechanism allows a network to prohibit low priority UEs. Barring is based on a bitmap in which each access class (AC 0-9) can be either barred or allowed.
5. Access class barring bypass: The ACB mechanism allows omitting access class barring for IMS voice and video users.
6. Application specific Congestion control for Data Communication (ACDC) barring: ACDC allows barring of traffic from/to certain applications. In this solution, applications are categorized based on global application identification (ID) (in Android or iOS). The network broadcasts barring parameters (barring factor and timer) for each category.

An ongoing evolution of these different access control mechanisms, in particular for $5^{th}$ generation cellular standards according to 3GPP, is to gather them into one single mechanism that can be configurable and adaptable to various network operator preferences. This is herein referred to as unified access control (UAC). With unified access control, there is a single set of access categories (similar to classes). At least some access categories should be possible to configure, such that, for example, access category X is used for certain pre-determined accesses. Access category X can relate to, for example which core network a certain UE is aiming to access, or what service triggers the access, e.g., SMS, MMTel or other services. Other aspects can also be included when determining access category. As an example an access category (UBMCat) determination can be dependent on a number of aspects, such as:

UBMCat=f( . . . ,AccessClass=nn,CN=NG,
  EstablishmentCause=mo,Service=ServiceID,
  DeviceType=MTC,callPriority=Low,
  ApplicationID=yy . . . ,Slice ID=NN,PLMN
  ID=pp, . . . )

Where Access class could denote the old access class as described above, CN is a core network type, Establishment cause is one of several establishment causes as described further below, Service=Service ID, Device Type can be for example a Machine Type Communication device, and a general priority for application ID yy could be considered low when accessing slice ID NN on PLMN ID pp.

All or any subset of these as well as other aspects may be considered when determining access category. This provides a flexible way to make a future-proof framework for access category and access barring. One proposed procedure is described below, in connection to FIG. 2.

Before an access is attempted by a UE (102), it needs to associate an event, such as for example a trigger from higher layers in the UE to send a signaling message, to an access category of the [1 . . . m] access categories. According to previously-proposed procedures, to determine what access category to use, the UE may be provided with instructions or rules from the network. FIG. 2 illustrates a signaling diagram for one exemplary procedure.

In a first step 202, a network node provides rules for which access category to use, based on considerations that relate to higher layers. In FIG. 2, this information is illustrated as originating from the network node (106) but may very well also originate from other network nodes and be transmitted to the UE via network node (106). If the network includes a higher level controller or policy functionality it may originate from another node hosting such controller or policy functionality. The higher layer rules may be signaled to the UE via Non-Access-Stratum (NAS) signaling, or it may be signaled using other protocols, for example, the UE (102) may include an entity that can be configured with and host access category rules signaled using an OMA-DM device management protocol.

Included in the rules from the network node (106) could be information related to for example, how a UE should select access category if the access is triggered by a certain service. Examples of such services can be for example an emergency service or an MMTel Service. Further, the rules can include information related to how a UE should select access category if an access is triggered by a certain application, such as, e.g., a certain game or a certain social media application. Rules can also include information related to access to various slices. For example, a small device-UE/IoT UE (102), may want to access, e.g., an IoT-optimized slice. Further, it is not uncommon that radio networks are shared between different operators or that one and the same operator is using different Public Land Mobile Network (PLMN) codes. There could be different rules for selecting access category dependent on if access is to occur for different PLMN's.

It should be noted that step 202 may also include signaling from the access node (104). Signaling of rules for selecting an access category may also be sent from the access node (104), e.g., in particular when it comes to access category selection for accesses that are triggered by, e.g., signaling with the access node. This may be referred to as Radio Access Network (RAN) signaling and may be communicating, e.g., using a Radio Resource Control (RRC) communications protocol.

The development of a unified access control mechanism for access barring is currently ongoing.

The access control and in particular the barring mechanisms are used to prevent UE's from sending an access request. There are also other mechanisms available for controlling the load in the network. For example, in situations when access barring allows an access attempt and a UE is allowed to send a Preamble (111) and an RRC Connection Request (113) (or RRC Connection Resume Request) or any equivalent message, herein referred to as msg3 the network may anyway respond with an RRC Connection Reject message. The reasons for this reject message can for example be, e.g., an overload situation that is not yet reflected on in the parameters governing the access barring. It can also be other reasons.

Before an RRC Connection Reject or an RRC Connection Setup or equivalent response message is sent to the UE, or before a msg3 leads to allocation of further resources, e.g., for subsequent signaling, the network side typically evaluates the reason for why the access request was sent. In msg3, the UE indicates an "establishment cause" to reflect the reason for why the access request was sent. In EUTRAN/LTE, this is a 3-bit field that can take the values: Emergency, High Priority Access, mt-Access, mo-Signalling, mo-Data, delayTolerantAccess-v1020, mo-VoiceCall-v1280, spare. (There is also a standard applicable for narrowband LTE and for this, the establishment cause field is slightly different.)

The establishment cause value sent in msg3 originates from higher layers in the UE. Non-Access Stratum is the term for the layers above the access layers. Lower layers, or access layers in the UE receive the establishment cause together with a call type indication for each event that should trigger an access request. The call type typically is an indication that controls the access barring in EUTRAN/LTE, according to the old access classes as described above, and indicates how the UE should perform the evaluation of access barring. Different call types are: "originating signalling", "emergency calls", "originating MMTEL voice", "originating MMTEL video", "originating SMSoIP", "originating SMS", "terminating calls", "originating calls", "mobile originating CS fallback".

Call Type, establishment cause and type of trigger (e.g., what type of NAS message or event that triggers a request to lower layers for transmitting an access request to the network) in combination with access class and barring parameters defines how lower layers shall behave both with respect to barring and what to include in a subsequent msg3 as establishment cause.

SUMMARY

One of the problems with the current specification of establishment cause is that, it only indicates a limited set of different reasons or causes for access. The msg3 format is important to keep as small as possible, such that a minimum amount of resources is used prior to that network getting information about what type of access request a certain RRC Connection Request message concerns. Limiting the establishment cause is therefore considered highly important.

In evolving wireless systems, new services, new deployment forms, and new events are considered and for many of these new aspects, a network operator would like to differentiate between when evaluating an RRC Connection Request. One of the concerns related to this is also that there may be future, yet unknown aspects that would be interesting to consider in connection to an RRC Connection Request (or corresponding message) and a way to cater for this, without writing a completely new standard, would be advantageous.

The establishment cause currently included in RRC Connection Request (msg3) does not include all the aspects used when determining the access category at access barring and vice versa. Therefore, it is not possible to ensure a consistent control of excess traffic, e.g. specific services, applications, UE types, etc, during system overload. For example, there is a risk that a given UE is granted access in the access barring check, but when performing access, the establishment cause indicated in RRC Connection Request (msg3) causes the network to wrongfully reject the request (by sending RRC Connection Reject as response).

Thus, new solutions are desired for indicating establishment cause in connection to evaluation of connection requests in the network. Also, there is a need to ensure a consistent control of excess mobile originating traffic during e.g. system overload.

According to certain embodiments, a method performed by a user equipment (UE) is disclosed. The method comprises determining, in response to an event that triggers the UE to perform an access request to a radio access network (RAN), an access category to apply. The method further comprises performing a barring check, applying the access category. Upon determining that access is not barred based on the access category, the access request is sent to a network node in the RAN, the access request including the access category, wherein the network node decides whether to accept or reject the access request based on the access category.

According to particular embodiments, prior to determining the access category to apply, the UE receives system information broadcast by the network node. The system information comprises access barring parameters for one or more access categories. According to particular embodiments, the barring check is performed using the access barring parameters for the applied access category.

According to particular embodiments, the system information further comprises an indication of a plurality of potential access categories that the UE may apply. The UE may reserve a number of bits in the access request to accommodate the plurality of potential access categories.

According to particular embodiments, the access request includes an access category information element that is divided into at least two parts, which represent the access category.

Also disclosed is a method performed by a network node in a radio access network (RAN). The method comprises receiving an access request from a user equipment (UE), the access request including an access category. The access request is triggered by an event and access is determined by the UE to not be barred based on the access category. The network node decides whether to accept or reject the access request based on the access category.

According to particular embodiments, prior to receiving the access request, the network node broadcasts system information, wherein the system information comprises access barring parameters for one or more access categories. The system information may further comprise an indication of a plurality of potential access categories that the UE may apply. The indication may further comprise an explicit indication of a number of bits to be reserved in the access request by the UE.

According to particular embodiments, the access request includes an access category information element that is divided into at least two parts, which represent the access category.

Also disclosed is a user equipment (UE). The UE comprises processing circuitry configured to determine, in response to an event that triggers the UE to perform an access request to a radio access network (RAN), an access category to apply. The processing circuitry is further configured to perform a barring check, applying the access category. Upon determining that access is not barred based on the access category, the processing circuitry is further configured to send the access request to a network node in the RAN, the access request including the access category, wherein the network node decides whether to accept or reject the access request based on the access category.

According to particular embodiments, prior to determining the access category to apply, the UE receives system information broadcast by the network node. The system information comprises access barring parameters for one or more access categories. According to particular embodiments, the barring check is performed using the access barring parameters for the applied access category.

According to particular embodiments, the system information further comprises an indication of a plurality of potential access categories that the UE may apply. The UE may reserve a number of bits in the access request to accommodate the plurality of potential access categories.

According to particular embodiments, the access request includes an access category information element that is divided into at least two parts, which represent the access category.

Also disclosed a network node in a radio access network (RAN). The network node comprises processing circuitry configured to receive an access request from a user equipment (UE), the access request including an access category. The access request is triggered by an event and access is determined by the UE to not be barred based on the access category. The processing circuitry is further configured to decide whether to accept or reject the access request based on the access category.

According to particular embodiments, prior to receiving the access request, the processing circuitry is further configured to broadcast system information, wherein the system information comprises access barring parameters for one or more access categories. The system information may further comprise an indication of a plurality of potential access categories that the UE may apply. The indication may further comprise an explicit indication of a number of bits to be reserved in the access request by the UE.

According to particular embodiments, the access request includes an access category information element that is divided into at least two parts, which represent the access category.

In one aspect of certain embodiments, a framework for determining and signaling establishment cause in an initial access request message like msg3 is provided. The framework is based upon that, instead of sending a separate establishment cause in msg3 as previously done, an access category indication is forwarded. The new unified access category is proposed to hold all characteristics necessary to be able to differentiate between different access causes and in addition, the rules for how they are determined can be controlled by the network. This provides a flexible way to cater for future needs of differentiation also when evaluating suitable response to a msg3 from the UE.

In another aspect of certain embodiments, an establishment cause value is coded dependent on how many access categories that are used in a network cell at a certain instance. It is proposed to define two sets of access categories: one smaller set, that would require less bits to signal as establishment cause and one larger set that would require more bits but that would also allow for a higher flexibility in differentiation of access requests.

In yet another aspect of certain embodiments, access category is replacing both establishment cause and call type as indications from higher layers in the UE and act as both input to barring checks in the UE as well as establishment causes in situations when transmitting an access request has been approved according to barring.

A core essence of the proposed solutions, according to certain embodiments, is to use the same parameter, known as access category, both to control access barring and also to be included in the RRC Connection request message sent from the UE to the access node on the network side. Since the same information is used both for access barring and as the cause for establishment, this ensures a consistent control of excess mobile originating traffic during e.g. system overload.

Another core essence of the proposed solutions, according to certain embodiments, is to divide the access categories in at least two sets that can be used and where each set would provide for an opportunity to have more or less bits consumed in the RRC Connection Request message when included in an access request. When the access categories are divided into at least two sets, this provides for an opportunity to have more or less bits consumed in the RRC Connection Request message when included in an access request, while still allowing for a higher flexibility in differentiation of access requests.

The proposed solutions of the present disclosure may provide one or more technical advantages. According to certain embodiments, the proposed solutions provide the possibility to define any establishment cause by the network operator, forward the rules for establishment causes/access categories to UEs registered in the network, and then enforce prioritization of these establishment causes/access categories both as barring categories and as cause values when determining how to respond to a UE access request from the network side.

Certain embodiments may have none, some, or all of the recited advantages, and other technical advantages may be readily apparent to one having skill in the art.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

The technology described herein can be used in various wireless systems and is not restricted to 3GPP EUTRA/LTE systems and 3GPP Next Generation systems (also referred to as the 5G system or 5GS) deploying New Radio (NR), even though such systems will serve as examples. Access control is a mechanism that may be applicable to any system where user, service, or other differentiation and load management of access is needed. Other examples may be wireless access pursuant to IEEE 802 standards, such as IEEE 802.11 WLAN standard or the IEEE 802.16 standard, but also 3GPP GSM evolutions.

Figure 3:
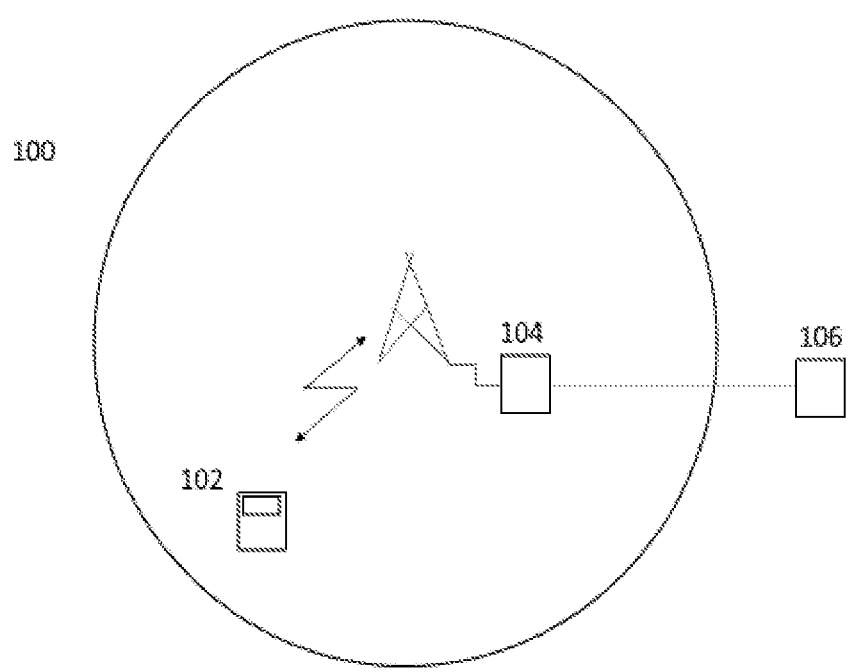
FIG. 3 illustrates a wireless communications network according to embodiments of the present disclosure.

Referring now to FIG. 3, a wireless access network is illustrated, for example pursuant to 3GPP LTE/EUTRA specifications.

The figure is very simplified to put focus on entities important to explain the disclosed embodiments. In the wireless access network (100), a UE (102) is illustrated. The UE (102) can request access to and communicate with an access node (104). The access node (104) is in turn connected to a node (106) that for example can provide internet access. In LTE, the access node is commonly referred to as eNB, whereas in other standards, it may be referred to as Node B, Base Station, or simply Access Point. In the evolution of next generation radio in 3GPP, the access point is sometimes referred to as "gNB". It should be noted that the illustration in FIG. 3 is traditional in the sense that it provides a view of "physical entities", but to a person skilled in the art, it should be apparent that for example an access node (104) or a node (106) can be implemented using distributed processing capacity. Similarly, they can also be implemented in the same physical entity. For purposes of this example, the description will associate the nodes with certain functionality rather than restricting to certain implementations.

The access node (104) communicates user information and signaling to and from the network node to the UE. The Wireless access network 100 is illustrated as a circle and contains in this figure only one "cell" area and one access node (104). It should be understood that any access network usually contains several access nodes and thus several areas or cells are served.

The node (106) can be one of many nodes. For example, it may be a control node (e.g., an MME, Mobility Management Entity in LTE, an AMF/SMF (Access and Mobility Management Function/Session Management Functions according to specifications for core network in 5G, e.g., 3GPP TS 23.501), for communicating control information with the UE, or it may be a user plane node (SGW, Serving Gateway or UPF, User Plane Management Function in 5G core networks), for communicating user data information to the UE. Further, the node may be connected with other nodes and work as a relay for information from these nodes to the UE. Such other nodes may for example be a packet gateway (PGW) or similar. The node (106) and other similar nodes will be referred to as belonging to higher layers in this description.

During evolution of NR, a novel concept has been introduced, denoted slicing. A slice is a new concept in 3GPP and refers to an end-to-end network realization or a set of network functions and resources that form a complete instantiated logical network, to meet a certain network characteristic. It can be compared with a way to view a "virtual" network, rather than a physical network. A slice can have various characteristics such as ultra-low latency. For example, a slice can provide its users with functionality that secure latency aspects such that latency is never higher than a certain requirement. To meet this, a set of network functions may be needed, e.g., functionality that secures very short interruptions or delays at handover. Other slices, that may be realized using the same access nodes (104) and network nodes (106), or others, may have other characteristics. There may for example be slices that don't even include a mobility function, as all users served through the slice may be stationary. These two examples show that to realize a service for different types of users, different functionalities may be needed, and each of these sets of functionalities are related to a slice realization. The slice can also be viewed as a method to isolate resources and perform separate management. For example, if a certain slice realization is of very high priority, certain processing resources or alternatively priority to common processing resources may be reserved such that lower priority slices cannot utilize them or only utilize them with lower priority. The concept of slicing is currently under development.

Before a UE performs access towards an access node, it needs to read certain system information that is usually broadcast by the access node 104. The system information describes how access should be performed to initiate communication between the UE (102) and the access node (104). Part of this system information may be information related to access barring. This barring information is usually broadcasted in the access network 100 and there can be different barring information in different cells or areas. Usually, one access node (104) will transmit its own barring information. The barring information may be arranged in a way such that it includes a set of access categories [1 . . . m] and for each category, information elements containing a barring factor and a barring time, for example as specified in 3GPP TS 36.331 v.14.1.0, 2016 December (see excerpt below, illustrating an example of ACDC barring information). This barring information per access category will be used by the UE attempting access and it is a way for the access node to limit and prioritize certain accesses over other.

Figure 1:
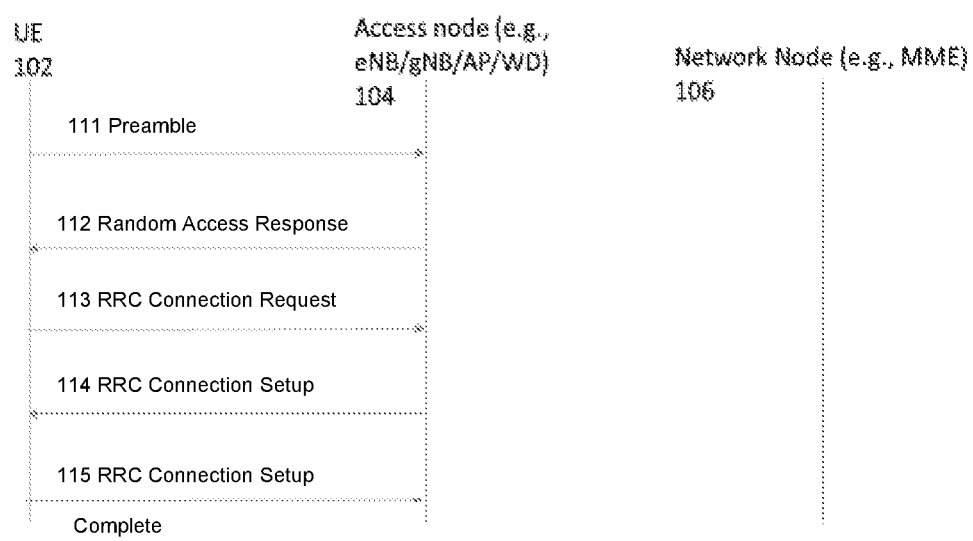
FIG. 1 illustrates a signaling diagram related to an RRC connection.

Once the barring mechanisms have been passed and the UE will send an access request to the network, there may be an establishment cause included in the request. In particular, for EUTRAN, establishment causes are used in RRC Connection Request or RRC Resume Request messages to indicate the reason for establishment. This random access and RRC connection establishment process as shown in FIG. 1. The main purpose of using establishment causes in this process is to allow differentiation by the network, dependent on cause. What the RAN needs to know is how important it is to admit that UE at that point to allocate resources between the random access and subsequent signaling, e.g., Initial Context Setup. For example, the network may choose to treat certain establishment causes with higher priority than others.

For EUTRAN, as specified in 3GPP, the UE higher layers NAS will, when requesting (or requesting to resume) a signaling connection establishment to lower layers, provide an RRC establishment cause and a call type. The RRC establishment cause is then included in msg3, the RRC Connection Request (113) and the call type is used internally in the UE for purposes of access barring checks. This is further described in 3GPP TS 36.331.

According to one aspect of the present disclosure, the establishment cause included in the RRC Connection Request is the same as the access category considered for access barring. Thus, according to the disclosure, the lower layers in the UE do not receive an establishment cause and a call type from higher layers in the UE, but rather receives an access category from the higher layers and it is this access category that is also included, instead of establishment cause, in the RRC Connection Request message.

The access category can thus serve both as the source for evaluation of barring in the access layer in the UE. If barring criteria is passed with the access category as input, an indication of access category will be included in the msg3 (RRC Connection Request, Resume Request or another corresponding message, e.g., as defined for 3GPP Standard on NR).

One of the benefits of using the access category instead of another establishment cause is that the same information is used both for barring functionality in the UE and for accept/reject determination in the network access node. This will avoid any potential problematic situation of, e.g., always barring an access request in the UE that would always be admitted in the access node, or vice versa. Another advantage of introducing the access category instead of another establishment cause is that of future-proofness.

The access category described above is flexible and a network operator can determine what events, what traffic types, what services and for what slices, etc., a certain access category should be used. It will thus be possible to determine priority both in terms of access barring, but also in terms of evaluation of requests received in the access node (msg3). It is not necessary to specify, in advance, exact priority of an access category, nor is it necessary to standardize a mapping

```
BarringPerACDC-Category-r13 ::= -SEQUENCE {
    acdc-Category-r13              INTEGER (1 . . . maxACDC-Cat-r13),
    acdc-BarringConfig-r13         SEQUENCE {
        ac-BarringFactor-r13           ENUMERATED {
                                           p00, p05, p10, p15, p20, p25, p30, p40,
                                           p50, p60, p70, p75, p80, p85, p90, p95},
        ac-BarringTime-r13             ENUMERATED {s4, s8, s16, s32, s64, s128, s256, s512}
    }                              OPTIONAL        -- Need OP
``` of a certain access category to a certain event. This flexibility is desirable both from an access barring perspective as well as from the perspective of evaluation of access requests in the access node.

The present disclosure effectively removes the limitations described for the establishment causes as they are currently provided by higher layers in the UE, for inclusion in the RRC Connection Request messages.

The main benefit with replacing the establishment cause with access category is that of flexibility and coherence. The cost of this is that the establishment cause as transmitted in the RRC Connection request message will cost more code space, more bits will be needed than the current establishment cause.

It is envisioned that a fairly high number of access categories may be needed. For example, if operators would like to differentiate between accesses of slices, which can be defined and served in the hundreds, a suitable number of access categories would be needed. Even though not all slices need differentiation in access control, it may still be in excess of 100 categories that should be supported, which will mean that, e.g., in excess of 7 bits will be needed to include the exact access category in the establishment cause message.

According to another aspect of the present disclosure, it is proposed that an operator can flexibly decide how many access categories that are applicable in certain cells, or portions of the network.

According to one embodiment of the present disclosure, an operator decides that 64 access categories are enough, both from the perspective of barring and from the perspective of including as an indication in the RRC Connection request message.

64 categories can be represented by a 6-bit code. Thus, 6 bits would need to be reserved in the RRC connection request message. The operator will define category determination rules according to, e.g., FIG. 2 above, and provide to the UE NAS layers. Barring factors and barring times will be broadcast and the UE access layers will be provided with the category from UE NAS layers and the barring parameters for that access category from system information, and ultimately include the determined category for each event in the RRC Connection Request message.

However, another operator may think that 64 access categories are too many and will settle for 16 categories. That operator can thus choose to only define rules for mapping events to 16 categories and UE access layers will only check barring for maximum 16 categories and will only transmit a 4-bit codeword when sending RRC Connection request messages for that operator.

According to the present disclosure, it is proposed to allow flexibility in how many access categories that are defined—both how many rules for mapping events to categories there may be (although a maximum is needed) and the exact amount of bits that should be used in the RRC connection Request message in a cell is signaled in system information. By broadcasting system information indicating, e.g., that in a certain cell RRC Connection Request shall be 6 bits, it will be possible to allow for both larger RRC Connection request messages that allow for a more granular differentiation possibility with a larger access category range as well as smaller RRC Connection request messages that allow for less granular differentiation, but instead carry the advantage of the need for less bits.

Thus, according to the proposed solutions, the amount of access categories can be flexible according to the table below:

| Access Category Range | #Rules transferred to UE NAS | Codeword length in msg3 |
|---|---|---|
| 0 . . . 7 | 8 | 3 |
| 0 . . . 15 | 16 | 4 |
| 0 . . . 31 | 32 | 5 |
| 0 . . . 63 | 64 | 6 |
| 0 . . . 127 | 128 | 7 |
| 0 . . . 255 | 256 | 8 |
| . . . | | |
| . . . | | |

With the indication in system information, the amount of access categories can in theory be infinite.

According to another aspect of the present disclosure, not all access categories are flexible to be configured by the operators. Some access categories are standardized and pre-defined, such that, e.g., all UE's entering a cell or a network they perhaps never have visited, will still have a pre-defined set of access categories. Among these standardized access categories may be, e.g., an access category for emergency calls, an access category for initial attach, and an access category "default" to use when, e.g., rules for how to determine mapping between access triggers and access category are not received from the network.

It is proposed that these standardized access categories are the lowest numbered (identities) access categories and that these always have the same access category number irrespective of what the selection of how many access categories shall be used. For example, there may be the following pre-defined set of access categories:

Access category 0 - Reserved
Access category 1 - Reserved for NSPS use
Access category 2 - Reserved for mission critical applications
Access category 3 - Reserved for access network operator
Access category 4 - Public Emergency calls (text/data/sms/mms/voice)
Access category 5 - Public Emergency calls (video/streaming)
Access category 6 - Paging response
Access category 7 - Initial attach (no rules available in UE)
Access category 8 - Default
. . .

Other pre-defined or standardized access categories may of course be possible. According to the proposed solutions, these access category numbers are the same, irrespective of if the access category range determined by an operator is, e.g., 16, 32, 64 or even a higher number of access categories. Access category ID's/numbers that are defined by the operator, e.g., an access category for running voice service over a certain CN and specific slice, have higher values.

According to yet another aspect of the present disclosure, there is a need to cater for access to networks without users actually reading all the system information. This may be important in, e.g., emergency situations, or for other reasons, when quick access to a network is necessary. To cater to such situations a default size of access categories may also be defined. This default set should correspond to an RRC Connection Request message size that can always be transmitted, i.e., the smallest access category set. For example, according to an alternative embodiment of the present disclosure, if a UE enters a cell or a network for which it has no access category rules and haven't decoded system information to determine how many access categories that are configured and what size of the RRC Connection Request message that should be used, it should always be possible to send an RRC Connection Request message with a default size. According to one aspect of the present disclosure, the default RRC Connection Request size can correspond to how many bits it would require to at least indicate one of all pre-defined/standardized access categories. In the example above, the default msg3-size corresponds to a 3-bit access category.

According to an alternative embodiment of this aspect of the disclosure, either the default size or the size expected by the access node, for the RRC Connection Request message may be indicated in msg2 (112) in FIG. 1, i.e., in the Random Access Response message.

Figure 4:
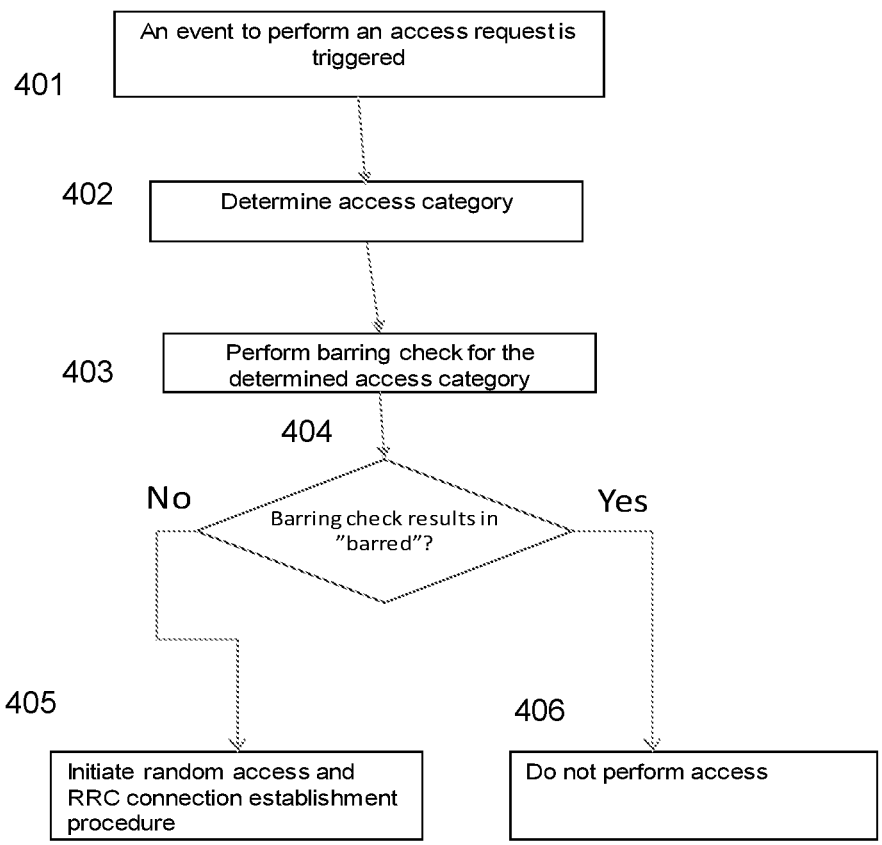
FIG. 4 illustrates a flow diagram of a method performed by a UE according to embodiments of the present disclosure.

FIG. 4 illustrates events in the UE according to one embodiment of the present disclosure.

In step 401 an event is occurring, e.g., on higher layers in the UE, that trigger an access request being sent to lower layers.

Prior to event 401, the UE may have read the system information that is being broadcast by the access node (104), where system information would include details on access barring parameters for relevant access categories. In addition, the system information may also include details on what format that should be used for msg3, in particular an explicit or implicit indication of what code-length to use for access category.

Figure 2:
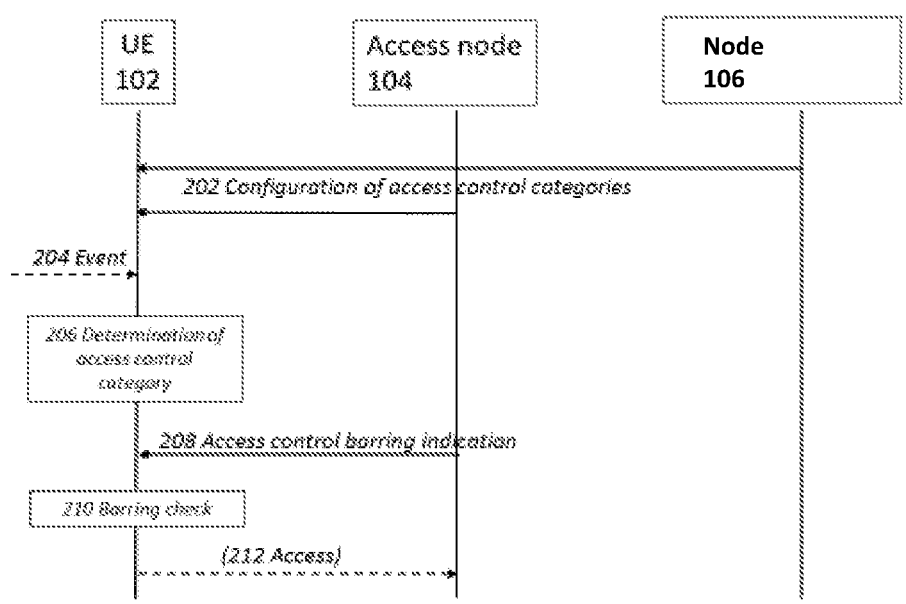
FIG. 2 illustrates a signaling diagram related to access category determination.

In step 402, the UE determines, based on the event and on rules for determining access category, for example as received over NAS, according to FIG. 2 above. If no rules are available, the UE may map the event according to standardized rules and to standardized access categories.

The higher layers in the UE (e.g., NAS) will then forward a request to lower layers (Access Layers) in the UE, including the access category determined. This is in contrast to how it is done in LTE/EUTRAN, where both a call type and establishment cause are provided by higher layers.

In step 403, typically lower layers in the UE will perform a barring check for the determined access category. This step will include, based upon the system information read and the barring factors applicable for the determined access category, an assessment on if an access request is allowed or if the request is barred (404).

If the result is barred (406), the UE lower layers may respond to UE higher layers with the result of the barring check, and an access request will not be performed.

If the result of the barring check allows an access request (405), the UE will initiate the access request by transmission of msg1 and then, when responded to by the network, a msg3. The msg3 will then include the access category.

In particular, upon reception of msg2 from the network, if information that indicates expected RRC Connection Request, Resume Request, or other equivalent msg3 format (for example related to how many bits that should be used for access category signaling in msg3), the UE will format msg3 according to this indication. If msg2 includes information that indicates that signaling access category in msg3 should be done with, e.g., 5 bits, the UE will format the information field/codeword for access category to be 5 bits.

Based upon the response from the access node (104), in subsequent steps the UE may continue with a msg5 (a compete message) or, if the access request is rejected, perform, e.g., backoff procedures as indicated by the reject message.

Figure 5:
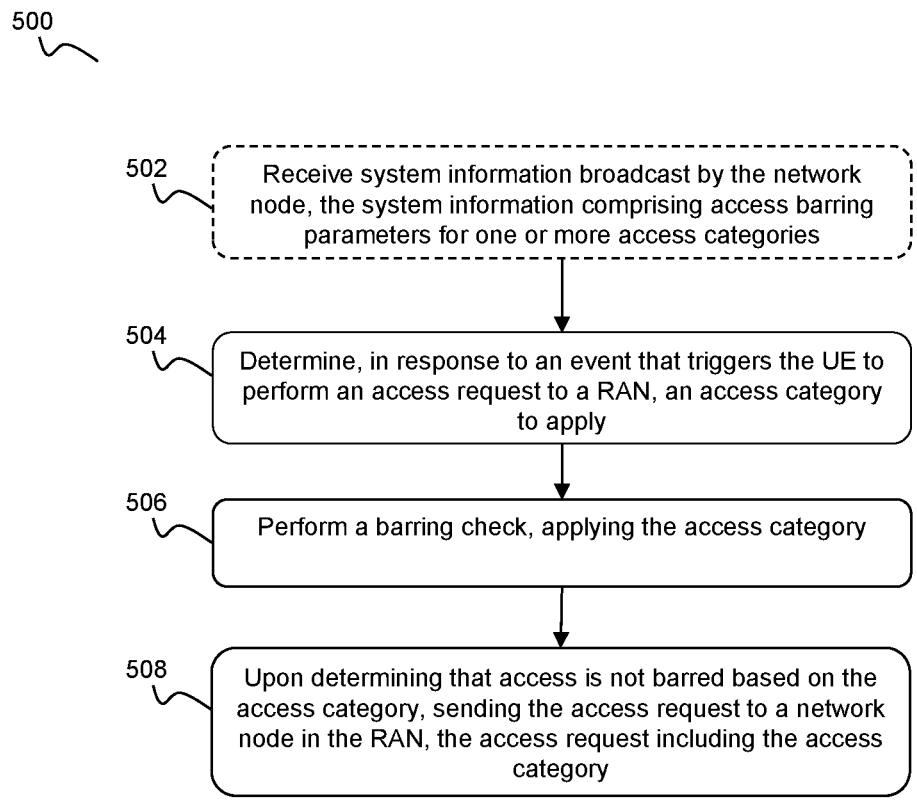
FIG. 5 illustrates a flow diagram of a method performed by a UE according to embodiments of the present disclosure.

FIG. 5 illustrates a flow diagram of a method (500) performed by a UE, according to certain embodiments. According to an optional step 502, the UE receives system information broadcast by a network node. This system information may comprise access barring parameters for one or more different access categories. According to certain embodiments, this system information may comprise an indication of a plurality of potential access categories that the UE may apply.

At step 504, the UE determines, in response to an event that triggers the UE to perform an access request to a radio access network (RAN), an access category to apply. This may be any event, command, or decision, either outside of the UE or by the UE itself, to perform an access request to the RAN.

According to certain embodiments, the determination of step 504 may be performed based on the triggering event and rules for mapping the triggering event to a particular access category. These rules may be stored by the UE and/or broadcast in system information from the network node and may map particular triggering events to particular access categories. According to certain embodiments, if no such rules are available to the UE, the triggering event may be mapped to a pre-defined access category. This pre-defined access category may be stored by the UE and/or broadcast by the triggering node. In certain embodiments, the pre-defined access category may be defined by a standard setting organization (e.g., 3GPP).

At step 506, the UE performs a barring check, applying the access category determined in step 504. This barring check determines whether the UE is even allowed to perform an access request to the RAN, or if access is barred. According to certain embodiments, the barring check is performed using the access barring parameters for the particular applied access category.

At step 508, upon determining that the access is not barred based on the access category, the UE sends the access request to a network node in the RAN. This access request includes the same access category determined at step 504 and used in the barring check at step 506. This access category may also serve as an establishment cause, for use by the network node in determining whether or not to grant access. According to certain embodiments, the access request may be one of a Radio Resource Control (RRC) Connection Request and RRC Connection Resume Request.

According to certain embodiments, the UE may reserve a particular number of bits in the access request. This number may be any suitable number in order to accommodate the plurality of potential access categories. According to particular embodiments, the system information broadcast in step 502 may include an explicit indication of the number of bits to be reserved. According to alternative embodiments, the system information may include an implicit indication of the number of bits to be reserved. Either way, the indication may provide for the bits to be divided into at least two parts (e.g., M bits+N bits). The UE may map a triggering event to a particular access category and represent the access category with an access category information element that is divided into the at least two parts.

According to particular embodiments, the first part of the access category information element may comprise N bits and the second part may comprise M bits, where M and N are integers. According to certain embodiments, the N bits are reserved for standardized access categories and the M bits are reserved for operator-defined access categories. According to certain embodiments, the number of bits reserved for operator-defined access categories is variable and may vary depending on particular operator. According to certain embodiments, the number of bits reserved for standardized access categories may be a fixed number. For example, if a particular event or category (e.g., "Public Emergency calls (text/data/sms/mms/voice)") is predefined or standardized to always be mapped to access category ID number 4, it will not matter if the information element/ codeword for access category is 3 bits long or 7 bits long (or any other value)—this access category would always be coded to be ID number 4.

Figure 6:
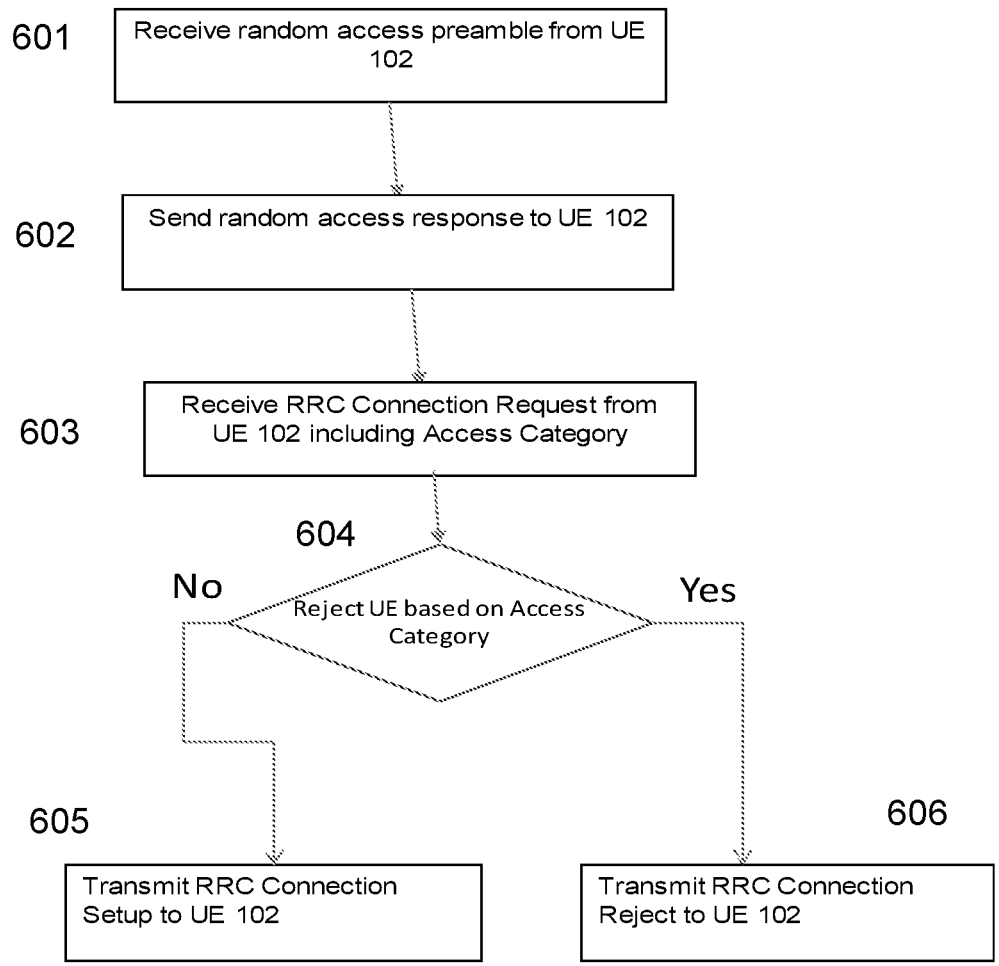
FIG. 6 illustrates a flow diagram of a method performed by a network node according to embodiments of the present disclosure.

FIG. 6 illustrates events on the access node side (104), for example the gNB, according to one embodiment of the present disclosure.

Prior to step 601, the access node 104 would typically have been responsible for forwarding system information to the UE, indicating, e.g., barring factors and barring times for at least some access categories. The access node 104 would also have been responsible for forwarding of information related to what format that should be used for RRC Connection Request by the UEs attempting access.

In step 601, the access node 104 receives a preamble from the UE 102. Then, the access node will allocate resources to the UE for transmission of an RRC Connection Request, an RRC Connection Resume Request, or any corresponding message, msg3. The resources allocated would be indicated to the UE through transmission of a random access response in step 602. The random access response may in some embodiments of the present disclosure also include an indication of how many bits that should be used in msg3 for access category.

In step 603, the network node will then receive the msg3 and read, e.g., identity indications included as well as the access category. Partially based upon the access category, the access node will make an assessment of whether the access request should be responded to with resources for continued signaling or if the access request should be rejected. The access category included will indicate to the UE what type of access it is, according to access categories either standardized or configured by the operator. Other aspects that would be relevant in when the access node determines whether to reject or admit the access request could be for example the load in the cell, barring factors for the particular access category, indications from higher level network nodes (106) on possible overloads or priority. These and many other aspects can also be combined with the access category information provided by the UE to determine this step. It should be noted that in using the access category, the indication to the access node 104 can include a lot of implicit information about what type of access it is. For example, it can reveal service, slice, and UE priority. This is all based upon the determination of the access category as provided by higher layers to the UE.

In the following step 604, the access node may then either reject the access request and transmit a reject message in step 606, or it may allocate further signaling resources and transmit an RRC Connection Setup message to the UE 102 in step 605.

Figure 7:
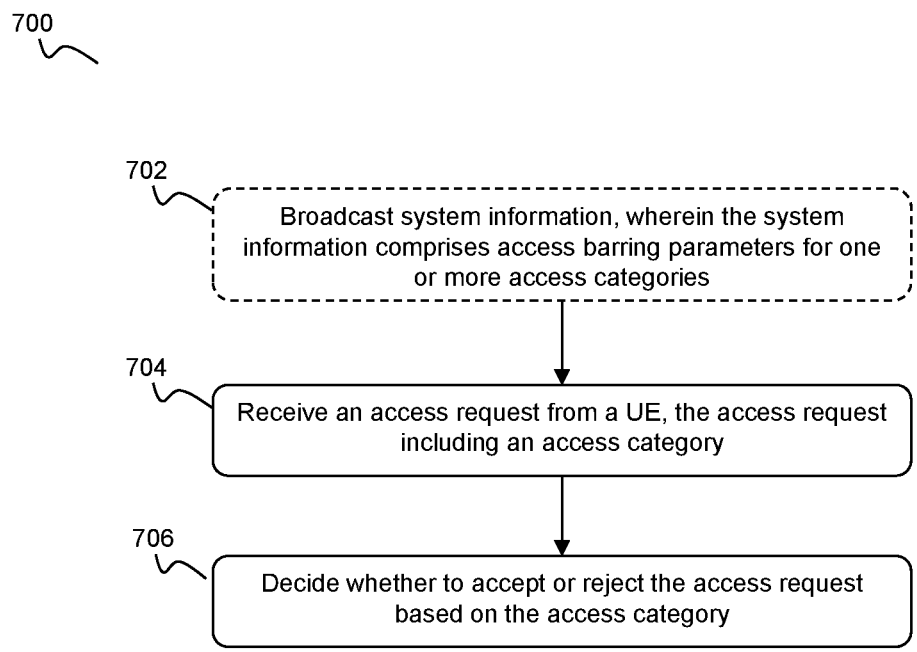
FIG. 7 illustrates a flow diagram of a method performed by a network node according to embodiments of the present disclosure.

It should be noted that the steps illustrated in FIGS. 4-5 (for the UE) and FIGS. 6-7 (for the access node) do not include all actions done in either the UE or in the access node, but rather a subset essential to understand the proposed solutions. For example, more actions are taken in the access node to communicate with other network nodes (106).

FIG. 7 illustrates a flow diagram of a method (700) performed by a network node according to certain embodiments. According to an optional step 702, the network node broadcasts system information. This system information comprises access barring parameters for one or more different access categories. According to certain embodiments, the system information may comprise an indication of a plurality of potential access categories that a UE may apply. According to particular embodiments, the system information may include an explicit indication of a number of bits to be reserved. According to alternative embodiments, the system information may include an implicit indication of the number of bits to be reserved. Either way, the indication may provide for the bits to be divided into at least two parts (e.g., M bits+N bits).

At step 704, the network node receives an access request from a UE. This access request includes a particular access category. According to particular embodiments, the access request may be one of a Radio Resource Control (RRC) Connection Request and an RRC Connection Resume Request. According to particular embodiments, the access category may include an access category information element that is divided into at least two parts. According to particular embodiments, the first part of the access category information element may comprise N bits and the second part may comprise M bits, where M and N are integers. According to certain embodiments, the N bits are reserved for standardized access categories and the M bits are reserved for operator-defined access categories. According to certain embodiments, the number of bits reserved for operator-defined access categories is variable and may vary depending on particular operator. According to certain embodiments, the number of bits reserved for standardized access categories may be a fixed number. For example, if a particular event or category (e.g., "Public Emergency calls (text/data/sms/mms/voice)") is predefined or standardized to always be mapped to access category ID number 4, it will not matter if the information element/codeword for access category is 3 bits long or 7 bits long (or any other value)—this access category would always be coded to be ID number 4.

According to certain embodiments, the access category included in the access request of step 704 serves as an establishment cause, for use by the network node in determining whether or not to grant access.

Figure 8:
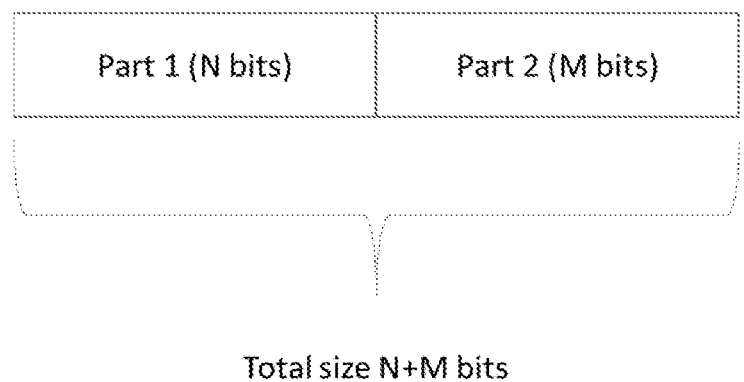
FIG. 8 illustrates an example format of access category according to embodiments of the present disclosure.

At step 706, the network node decides whether to accept or reject the access request based on the access category included in the access request. As mentioned above, the establishment cause indicated by the access category may be used by the network node in this determination step. This decision may be based on a number of other factors, including, without limitation, one or more of triggering event, traffic type, service type, slice, and UE priority. FIG. 8 illustrates an example format of the access category information element when included in e.g. the RRC Connection Request message (also known as msg3).

In the illustrated example, the access category information element is divided into two parts, as discussed above in FIG. 5 and FIG. 7. However, in general, it can be divided into more than two parts using the same principle as described here.

According to the illustrated embodiment, the first part ("Part 1") contains N bits, where N can for example be 3. Other values may be used as appropriate. Part 1 is used for pre-defined or standardized access categories. The value of N may, for example, be influenced by how many values are defined for standardized access categories (a value which is typically fixed). For instance, if there are 8 defined values for standardized access categories, 3 bits would be needed for N. With 64 defined values, 6 bits would be needed for N. Other factors may influence the value of N, as described further herein.

According to the illustrated embodiment, the second part ("Part 2") contains M bits, where M can for example be 5. Other values may be used as appropriate. Part 2 is used for operator-defined access categories. The total size of the access category information element is thus N+M bits, which is for example 3+5=8 bits. The value of M may, for example, be influenced by the number of operator-defined access categories (a value which is typically variable). For instance, if there are zero (i.e., the operator is not using operator-defined access categories), 0 bits would be needed for M. If the number is 64, 6 bits would be needed for M. Other factors may influence the value of M, as described further herein.

It should be understood than the length of Part 2 (M) may vary depending on operator, and thus also the access category information element may be of variable length. The length depends on how many access categories that are defined by the operator (in Part 2).

It should be understood that the access category information element described above may also be included in other messages, such as the RRC Connection Resume message or any other RRC message or signalling message.

In an alternative embodiment of the present disclosure, the format of access category only includes one part with variable length. The codepoints, i.e., the access category number ID's for pre-defined access categories may then be maintained. For example, if "Public Emergency calls (text/data/sms/mms/voice)" is predefined to always be mapped to access category ID number 4, it should not matter if the information element/codeword for access category is 3 bits long, or 7 bits long, this access category should always be coded to be ID number 4.

In yet another alternative embodiment, the access category may contain only one of multiple alternative parts, such as one of the Part 1 and Part 2 in the example above. Thus, when the UE includes the access category information element it would for example contain either Part 1 or Part 2. For example, if the UE is not aware or have been informed by the network about any operator-specific access categories, such as when performing Attach, it includes a pre-defined access category and thus only sends Part 1. At a later stage, when the UE is aware of operator-specific categories, it instead sends Part 2 when performing RRC connection establishment.

As it is the higher layers, i.e., network node 106, that communicate information related to how a UE should determine what event to map to what access categories, and it is the access node 104 that signals or determines how many bits that should be used for indicating access category in msg3, there could in theory be a mismatch. For example, maybe network node 106 has provided a UE with rules for determining mapping to an access category with ID number 35 and such event occurs in the UE, but the access node 104 indicates, either through system information or via a random access response, that only 4 bits may be used to indicate access category in msg3. The behavior from the UE side may then be to do a re-mapping of access category 35, since it was not possible to signal, to access category "default", i.e., category number 8 in the example embodiment above, or it could alternatively use another pre-defined access category, specifically pre-defined for such purposes.

The embodiments contemplated herein have been described in terms of various network nodes and elements, which will now be described in more detail with reference to the following FIGURES.

As discussed above, the solutions described herein may be implemented in any appropriate type of system using any suitable components. Although described at a high level in relation to FIG. 3 above, particular embodiments of the described solutions may also be implemented in a wireless network such as the example wireless communication network illustrated in FIG. 9, which describes the various elements in more detail. In the example embodiment of FIG. 9, the wireless communication network provides communication and other types of services to one or more wireless devices. In the illustrated embodiment, the wireless communication network includes one or more instances of network nodes that facilitate the wireless devices' access to and/or use of the services provided by the wireless communication network. The wireless communication network may further include any additional elements suitable to support communication between wireless devices or between a wireless device and another communication device, such as a landline telephone.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

Figure 9:
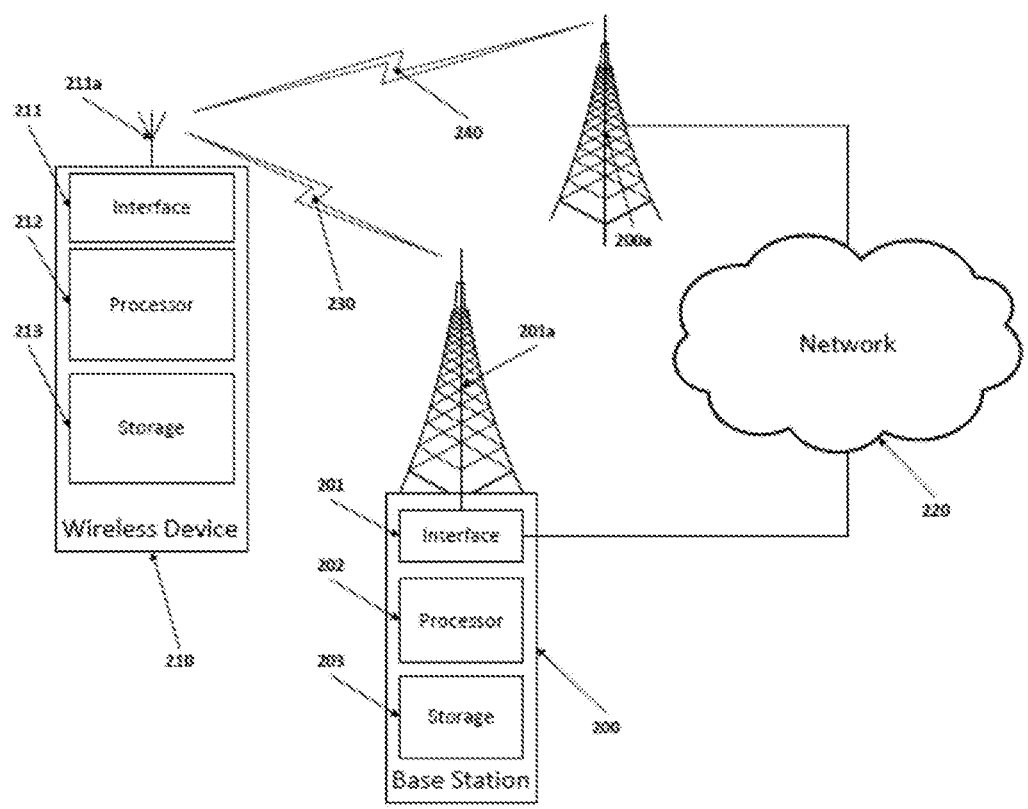
FIG. 9 illustrates a wireless communications network according to embodiments of the present disclosure.

FIG. 9 illustrates a wireless network comprising a more detailed view of network node 200 and wireless device (WD) 210, in accordance with a particular embodiment. For simplicity, FIG. 9 only depicts network 220, network nodes 200 and 200a, and WD 210. Network node 200 comprises processor 202, storage 203, interface 201, and antenna 201a. Similarly, WD 210 comprises processor 212, storage 213, interface 211 and antenna 211a. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device access to the wireless communication network or to provide some service to a wireless device that has accessed the wireless communication network.

As used herein, the term "radio node" is used generically to refer both to wireless devices and network nodes, as each is respectively described above.

In FIG. 9, Network node 200 comprises processor 202, storage 203, interface 201, and antenna 201a. These components are depicted as single boxes located within a single larger box. In practice however, a network node may comprise multiple different physical components that make up a single illustrated component (e.g., interface 201 may comprise terminals for coupling wires for a wired connection and a radio transceiver for a wireless connection). As another example, network node 200 may be a virtual network node in which multiple different physically separate components interact to provide the functionality of network node 200 (e.g., processor 202 may comprise three separate processors located in three separate enclosures, where each processor is responsible for a different function for a particular instance of network node 200). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless device, such as WD 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201 which may be used in the wired or wireless communication of signaling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" (WD) refers to a device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the $3^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication and may, in this case, be referred to as a D2D communication device.

As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 9, WD 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200 and/or other WDs. WD 210 comprises processor 212, storage 213, interface 211, and antenna 211a. Like network node 200, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. Storage 213 may be used to store any calculations made by processor 212 and/or any data received via interface 211.

Interface 211 may be used in the wireless communication of signaling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

Figure 10:
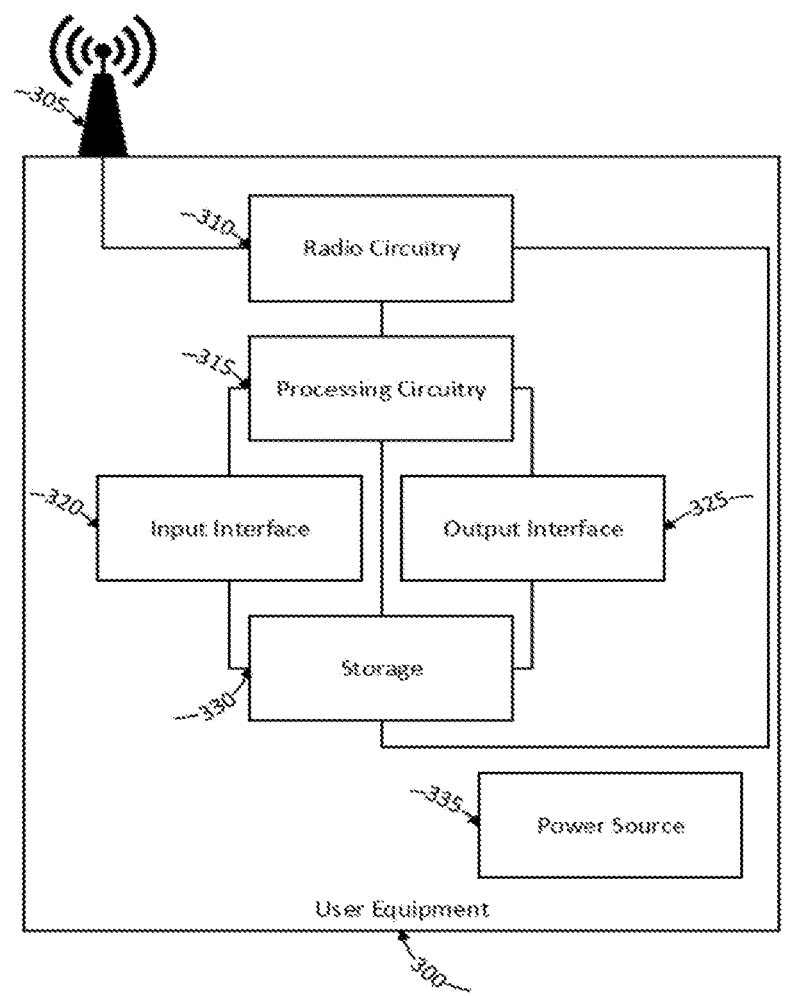
FIG. 10 illustrates a user equipment according to embodiments of the present disclosure.

As shown in FIG. 10, user equipment 300 is an example wireless device. UE 300 includes an antenna 305, radio front-end circuitry 310, processing circuitry 315, and a computer-readable storage medium 330. Antenna 305 may include one or more antennas or antenna arrays, and is configured to send and/or receive wireless signals, and is connected to radio front-end circuitry 310. In certain alternative embodiments, wireless device 300 may not include antenna 305, and antenna 305 may instead be separate from wireless device 300 and be connectable to wireless device 300 through an interface or port.

The radio front-end circuitry 310 may comprise various filters and amplifiers, is connected to antenna 305 and processing circuitry 315, and is configured to condition signals communicated between antenna 305 and processing circuitry 315. In certain alternative embodiments, wireless device 300 may not include radio front-end circuitry 310, and processing circuitry 315 may instead be connected to antenna 305 without radio front-end circuitry 310.

Processing circuitry 315 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 315 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 315 executing instructions stored on a computer-readable storage medium 330. In alternative embodiments, some or all of the functionality may be provided by the processing circuitry 315 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 315 alone or to other components of UE 300, but are enjoyed by the wireless device as a whole, and/or by end users and the wireless network generally.

Antenna 305, radio front-end circuitry 310, and/or processing circuitry 315 may be configured to perform any receiving operations described herein as being performed by a wireless device. Any information, data and/or signals may be received from a network node and/or another wireless device.

The processing circuitry 315 may be configured to perform any determining operations described herein as being performed by a wireless device. Determining as performed by processing circuitry 315 may include processing information obtained by the processing circuitry 315 by, for example, converting the obtained information into other information, comparing the obtained information or converted information to information stored in the wireless device, and/or performing one or more operations based on the obtained information or converted information, and as a result of said processing making a determination.

Antenna 305, radio front-end circuitry 310, and/or processing circuitry 315 may be configured to perform any transmitting operations described herein as being performed by a wireless device. Any information, data and/or signals may be transmitted to a network node and/or another wireless device.

Computer-readable storage medium 330 is generally operable to store instructions, such as a computer program, software, an application including one or more of logic, rules, code, tables, etc. and/or other instructions capable of being executed by a processor. Examples of computer-readable storage medium 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 315. In some embodiments, processing circuitry 315 and computer-readable storage medium 330 may be considered to be integrated.

Alternative embodiments of UE 300 may include additional components beyond those shown in FIG. 10 that may be responsible for providing certain aspects of the UE's functionality, including any of the functionality described herein and/or any functionality necessary to support the solution described above. As just one example, UE 300 may include input interfaces, devices and circuits, and output interfaces, devices and circuits. Input interfaces, devices, and circuits are configured to allow input of information into UE 300, and are connected to processing circuitry 315 to allow processing circuitry 315 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 300, and are connected to processing circuitry 315 to allow processing circuitry 315 to output information from UE 300. For example, output interfaces, devices, or circuits may include a speaker, a display, vibrating circuitry, a USB port, a headphone interface, or other output elements. Using one or more input and output interfaces, devices, and circuits, UE 300 may communicate with end users and/or the wireless network and allow them to benefit from the functionality described herein.

As another example, UE 300 may include power source 335. Power source 335 may comprise power management circuitry. Power source 335 may receive power from a power supply, which may either be comprised in, or be external to, power source 335. For example, UE 300 may comprise a power supply in the form of a battery or battery pack which is connected to, or integrated in, power source 335. Other types of power sources, such as photovoltaic devices, may also be used. As a further example, UE 300 may be connectable to an external power supply (such as an electricity outlet) via an input circuitry or interface such as an electrical cable, whereby the external power supply supplies power to power source 335. Power source 335 may be connected to radio front-end circuitry 310, processing circuitry 315, and/or computer-readable storage medium 330 and be configured to supply UE 300, including processing circuitry 315, with power for performing the functionality described herein.

UE 300 may also include multiple sets of processing circuitry 315, computer-readable storage medium 330, radio circuitry 310, and/or antenna 305 for different wireless technologies integrated into wireless device 300, such as, for example, GSM, WCDMA, LTE, NR, WiFi, or Bluetooth wireless technologies. These wireless technologies may be integrated into the same or different chipsets and other components within wireless device 300.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, storage 203 may comprise computer readable means on which a computer program can be stored. The computer program may include instructions which cause processor 202 (and any operatively coupled entities and devices, such as interface 201 and storage 203) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any steps or functions disclosed herein.

Figure 11:
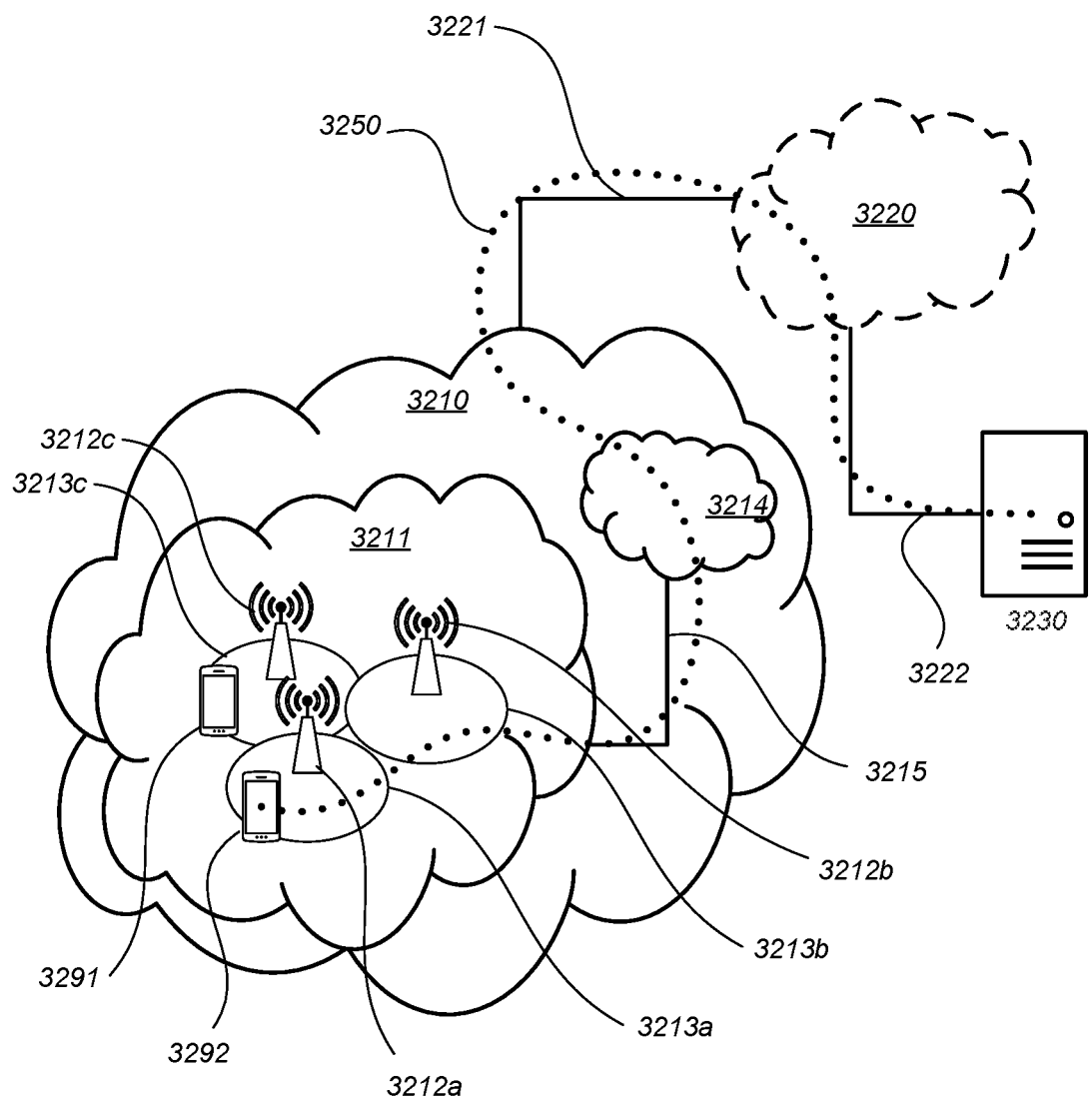
FIG. 11 illustrates a communication system according to certain embodiments of the present disclosure.

According to additional embodiments, with reference to FIG. 11, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
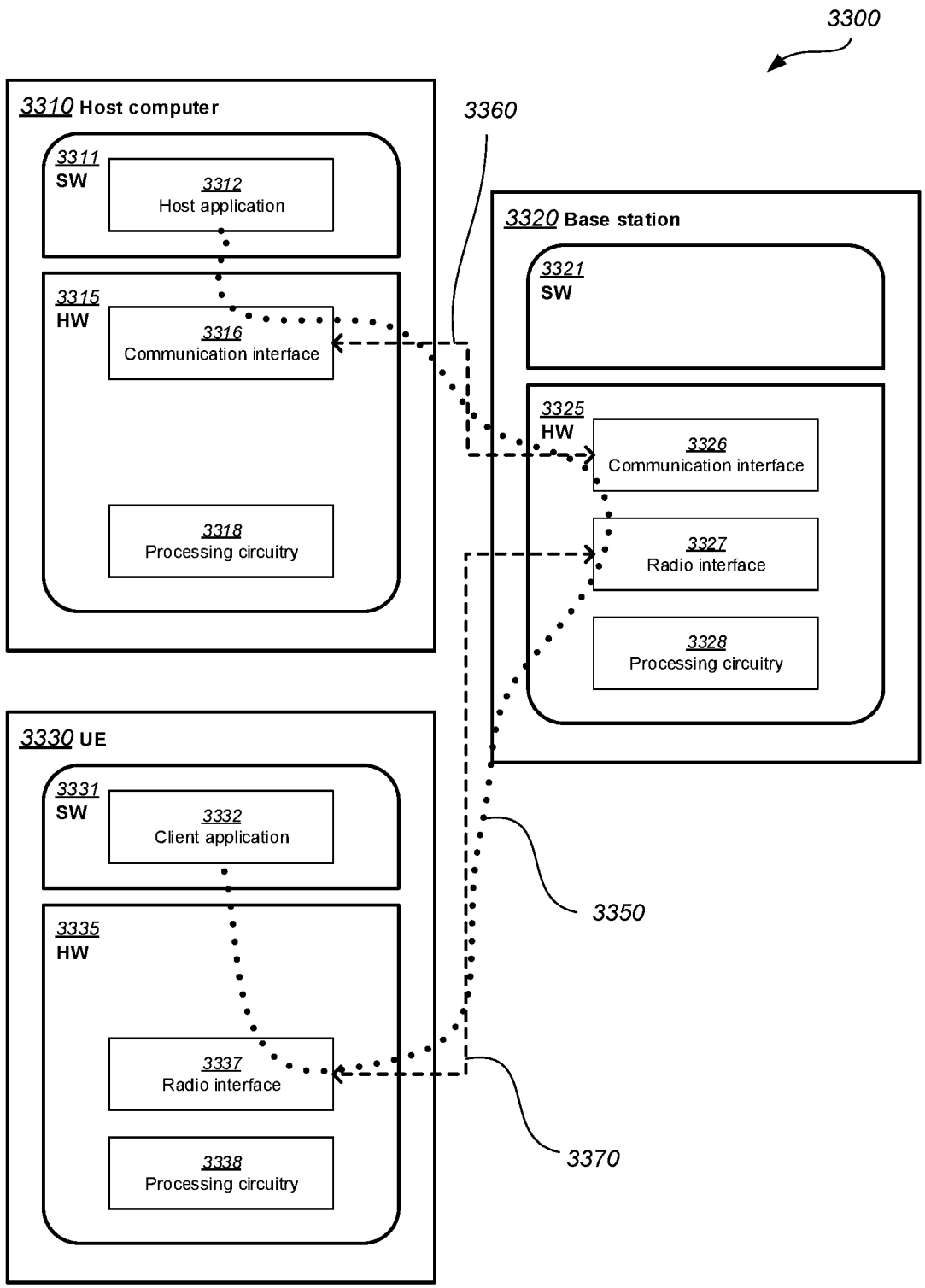
FIG. 12 illustrates a host computer, a base station, and a UE according to certain embodiments of the present disclosure.

It is noted that the host computer 3310, base station 3320 and UE 3330 illustrated in FIG. 12 may be identical to the host computer 3230, one of the base stations 3212a, 3212b, 3212c and one of the UEs 3291, 3292 of FIG. 11, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the determination of which logical channels are served, and thereby provide benefits such as improved quality of service.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 13:
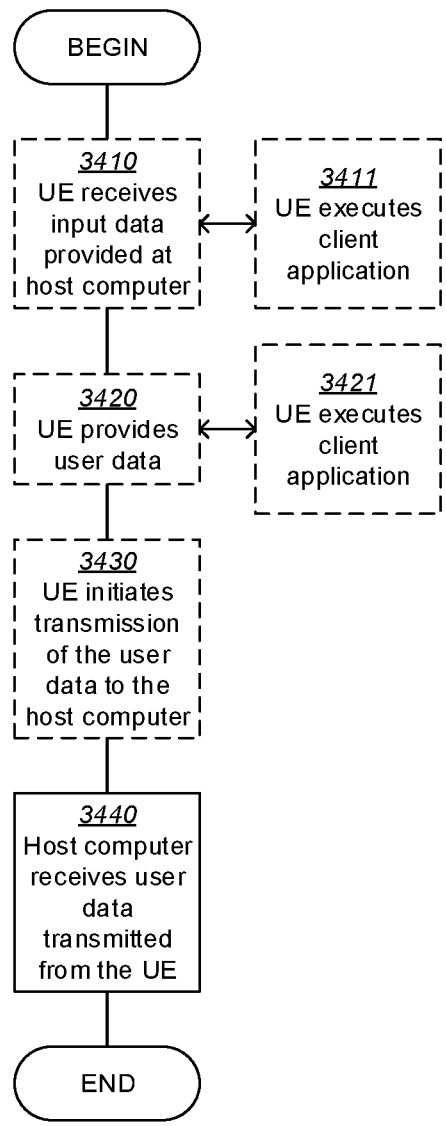
FIG. 13 illustrates a flow diagram according to certain embodiments of the present disclosure.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In an optional first step 3410 of the method, the UE receives input data provided by the host computer. Additionally, or alternatively, in an optional second step 3420, the UE provides user data. In an optional substep 3421 of the second step 3420, the UE provides the user data by executing a client application. In a further optional substep 3411 of the first step 3410, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3430, transmission of the user data to the host computer. In a fourth step 3440 of the method, the host computer receives the user data transmitted from the UE, in accordance with the teachings of the embodiments described throughout this disclosure.

Figure 14:
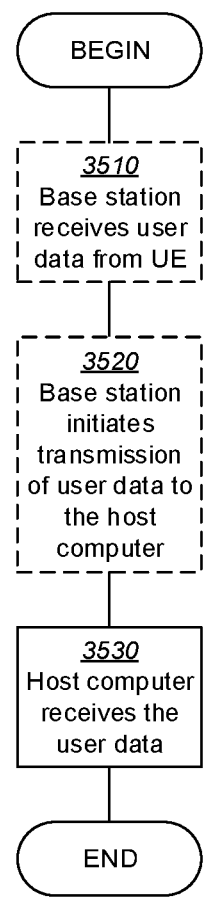
FIG. 14 illustrates a flow diagram according to certain embodiments of the present disclosure.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In an optional first step 3510 of the method, in accordance with the teachings of the embodiments described throughout this disclosure, the base station receives user data from the UE. In an optional second step 3520, the base station initiates transmission of the received user data to the host computer. In a third step 3530, the host computer receives the user data carried in the transmission initiated by the base station.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method performed by a user equipment (UE), the method comprising:
    determining, in response to an event that triggers the UE to perform an access request to a radio access network (RAN) an access category to apply, wherein prior to determining the access category to apply, the method comprising receiving system information broadcast by a network node in the RAN, wherein the received system information comprises an indication of a code-length to use for the access category;
    performing a barring check, applying the access category based at least on the code-length; and
    upon determining that access is not barred based on the access category, sending the access request to the network node in the RAN, the access request including the access category, wherein the network node decides whether to accept or reject the access request based on the access category and a network slice that the UE wants to access, wherein the network slice represents a virtual network.

2. A method performed by a network node in a radio access network (RAN), the method comprising:
broadcasting system information that comprises an indication of a code-length to use for an access category;
receiving an access request from a user equipment (UE) the access request including the access category, wherein the access request is triggered by an event and access is determined by the UE to not be barred based on the access category, wherein the access category is associated with the code-length of which the UE receives the indication, from the network node; and
deciding whether to accept or reject the access request based on the access category and a network slice that the UE wants to access, wherein the network slice represents a virtual network.

3. A user equipment (UE), comprising:
processing circuitry configured to:
determine, in response to an event that triggers the UE to perform an access request to a radio access network (RAN) an access category to apply, wherein, the processing circuitry is further configured to, prior to determining the access category to apply, receive system information broadcast by a network node in the RAN, wherein the received system information comprises an indication of a code-length to use for the access category;
perform a barring check, applying the access category based at least on the code-length; and
upon determining that access is not barred based on the access category, send the access request to the network node in the RAN, the access request including the access category, wherein the network node decides whether to accept or reject the access request based on the access category and a network slice that the UE wants to access, wherein the network slice represents a virtual network.

4. The UE according to claim 3, wherein, prior to determining the access category to apply, the processing circuitry is further configured to receive system information broadcast by the network node, wherein the system information comprises access barring parameters for one or more access categories.

5. The UE according to claim 4, wherein the barring check is performed using the access barring parameters for the applied access category.

6. The UE according to claim 4, wherein the system information further comprises an indication of a plurality of potential access categories that the UE may apply.

7. The UE according to claim 6, wherein the processing circuitry is further configured to reserve a number of bits in the access request to accommodate the plurality of potential access categories.

8. The UE according to claim 6, wherein the indication comprises an explicit indication of number of bits to be reserved in the access request by the UE.

9. The UE according to claim 3, wherein the processing circuitry is configured to determine the access category to apply based on the triggering event and rules for mapping the triggering event to a particular access category.

10. The UE according to claim 9, wherein if no rules are available, the triggering event is mapped to a pre-defined access category.

11. The UE according to claim 3, wherein the access request includes an access category information element that is divided into at least two parts, which represent the access category.

12. The UE according to claim 11, wherein:
a first part of the access category information element comprises N bits, which are reserved for standardized access categories;
a second part of the access category information element comprises M bits, which are reserved for operator-defined access categories; and
M and N are integers.

13. The UE according to claim 12, wherein M varies depending on operator.

14. The UE according to claim 12, wherein N is a fixed number.

15. The UE according to claim 3 wherein the access category serves as an establishment cause, and wherein the access request is one of a Radio Resource Control (RRC) Connection Request and RRC Connection Resume Request.

16. A network node in a radio access network (RAN), the network node comprising:
processing circuitry configured to:
broadcast system information that comprises an indication of a code-length to use for an access category;
receive an access request from a user equipment (UE) the access request including the access category, wherein the access request is triggered by an event and access is determined by the UE to not be barred based on the access category, wherein the access category is associated with the code-length of which the UE receives the indication, from the network node; and
decide whether to accept or reject the access request based on the access category and a network slice that the UE wants to access, wherein the network slice represents a virtual network.

17. The network node according to claim 16, wherein, prior to receiving the access request, the processing circuitry is further configured to broadcast system information, wherein the system information comprises access barring parameters for a plurality of access categories.

18. The network node according to claim 16, wherein the system information further comprises an indication of a plurality of potential access categories that the UE may apply.

19. The network node according to claim 16, wherein the indication comprises an explicit indication of number of bits to be reserved in the access request by the UE.

20. The network node according to claim 16, wherein the access request includes an access category information element that is divided into at least two parts, which represent the access category.

21. The network node according to claim 20, wherein:
a first part of the access category information element comprises N bits, which are reserved for standardized access categories;
a second part of the access category information element comprises M bits, which are reserved for operator-defined access categories; and
M and N are integers.

22. The network node according to claim 21, wherein M varies depending on operator.

23. The network node according to claim 21, wherein N is a fixed number.

24. The network node according to claim 16, wherein the processing circuitry is configured to decide whether to accept or reject the access based on the access category and one or more of:
triggering event;
traffic type;
service type;
slice; and
UE priority.

25. The network node according to claim 16, wherein the access category serves as an establishment cause, and wherein the access request is one of a Radio Resource Control (RRC) Connection Request and RRC Connection Resume Request.

* * * * *